United States Patent
Appleton et al.

(10) Patent No.: US 8,332,469 B1
(45) Date of Patent: Dec. 11, 2012

(54) WEB RESOURCE CACHING

(75) Inventors: Benjamin C. Appleton, Summer Hill (AU); Aaron Jacobs, Ashfield (AU)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 12/898,994

(22) Filed: Oct. 6, 2010

(51) Int. Cl.
*G06F 15/16* (2006.01)
*G06F 15/173* (2006.01)

(52) U.S. Cl. .................. 709/203; 709/224; 709/246

(58) Field of Classification Search .......... 709/203, 709/205, 217, 223, 227, 236; 711/125, 131
See application file for complete search history.

(56) References Cited

U.S. PATENT DOCUMENTS

| | | | |
|---|---|---|---|
| 6,598,075 B1 * | 7/2003 | Ogdon et al. | 709/227 |
| 7,013,289 B2 * | 3/2006 | Horn et al. | 709/203 |
| 7,133,896 B2 * | 11/2006 | Ogdon et al. | 709/205 |
| 7,937,438 B1 * | 5/2011 | Miller et al. | 709/224 |
| 2003/0037163 A1 * | 2/2003 | Kitada et al. | 709/236 |
| 2005/0044199 A1 * | 2/2005 | Shiga et al. | 709/223 |
| 2010/0071024 A1 * | 3/2010 | Eyada | 726/1 |
| 2010/0242028 A1 * | 9/2010 | Weigert | 717/131 |
| 2010/0299483 A1 * | 11/2010 | McDonald | 711/125 |
| 2010/0332583 A1 * | 12/2010 | Szabo | 709/217 |

* cited by examiner

*Primary Examiner* — Quang N. Nguyen
(74) *Attorney, Agent, or Firm* — Fish & Richardson P.C.

(57) ABSTRACT

Methods, systems, and apparatus, including computer programs encoded on a computer storage medium, for web page caching. In one aspect, a method includes a request to a server for a service in which the request specifies a natural language of a client user interface in a header of the request. A response from the server is received indicating that future requests for the service to the server are to identify the natural language in a uniform resource locator (URL) for the service. The URL is modified to include a path component that specifies the natural language. Future requests to the server for the modified URL are transmitted and information is received in response that is localized to the natural language specified in the path component of the modified URL.

15 Claims, 4 Drawing Sheets

WEB RESOURCE CACHING

TECHNICAL FIELD

This patent application generally relates to digital data processing and, in particular, to systems and techniques for improving caching of web resources.

BACKGROUND

The Internet allows people to access resources (e.g., web pages) from remote servers located around the world. These resources are often received from intermediary web cache devices rather than from the web servers which host the resources. Web caching allows users to access resources faster and eases load burdens on web servers.

For example, a user can submit a request using a web browser to a map service identified by the uniform resource locator (URL) "http://maps.google.com". The map service can have a client user interface that is available in numerous natural languages, such as English, French, Spanish, and so on. All of the different languages in which the service is provided are accessible through the same URL (i.e., "http://maps.google.com"). A caching device receives the request from the user's browser and forwards the request to a web server. The web server can determine a language of its response based on information contained in a field in the hypertext transfer protocol (HTTP) header of the user's request, such as an 'Accept-Language' header field. The Accept-Language header field specifies the preferred language of the user. The web server's response to the caching device includes information in the natural language specified by the Accept-Language header field. The web server also includes a language code defining which natural language is specified. This information is included in the response because the value of the Accept-Language header originates from the client device's browser program. A resource displayed or service run on the client device may not obtain this information from the browser directly, and thus may obtain the preferred natural language information from the server.

The web server can also, in its response, include a value in an HTTP header field, such as the 'Vary' header field, which can direct the caching device to cache the information in the response according to not only the URL of the request but also the language specified in the Accept-Language header field of the response. However, if the caching device does not properly interpret Vary fields, the caching device may not cache the response resource. On the other hand, if the server does not include the Vary field value, any user requesting the same URL will receive the previously cached English version of the information rather than a version of the information that is correct for their language.

SUMMARY

This specification describes technologies related to improving web caching. In general, one innovative aspect of the subject matter described in this specification can be embodied in methods that include the actions of transmitting a request for a service in which the request specifies a natural language of a client user interface in a header of the request, receiving a response to the request indicating that future requests for the service are to identify the natural language in a uniform resource locator (URL) for the service, modifying the URL to include a path component that specifies the natural language, and transmitting one of the future requests for the service using the modified URL and receiving information in a response that is localized to the natural language specified in the path component of the modified URL, and in which the information is cached using a key comprising the modified URL by one or more data processing apparatuses that receive the information. Other embodiments of this aspect include corresponding systems, apparatus, and computer programs, configured to perform the actions of the methods, encoded on computer storage devices.

These and other embodiments can each optionally include one or more of the following features. The header can be a hypertext transfer protocol header. The client user interface can be presented by a web browser. The client user interface can present a geographic map. The service can be a map service. The one or more data processing apparatuses can include a proxy server. The one or more data processing apparatuses can include a client device. The information can not include a hypertext transfer protocol Vary field.

Particular embodiments of the subject matter described in this specification can be implemented so as to realize one or more of the following advantages. For example, modifying the URL of resources to specify different versions can allow caching devices to cache a copy of each of the different versions. This allows a web server to utilize the advantages of caching resources for a greater number of the resources it provides, including faster responses to users, smaller loads on the web server, and lower network bandwidth usage.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

A resource is information that can be obtained over one or more networks (e.g., the Internet) from a data processing apparatus. For example, a resource can be a web page, a web service or other service, an image, audio data, streaming data (e.g., audio and video), or combinations of these. Resources can be provided by web servers or other data processing apparatuses to client devices such as personal computers, smart phones, tablet computers, or other devices. Between a server and a client device on a path on the network, there can be many other devices, for example, routers and proxy servers. Additionally, client devices can connect to the network through Internet service providers (ISPs). Some of the devices between the client device and the server can act as caching devices, making copies of resources to provide to client devices. If a client device requests a resource that has been stored on a caching device, the caching device can provide the resource in response, without forwarding the request to the server.

Caching can be performed by caching devices (e.g., data processing apparatuses) using a uniform resource identifier (URI) of a resource, such as the URL for the resource as an index of the resource in the cache storage. When the caching device, such as a proxy server, receives a request from the client device specifying the URL of a resource the caching device has stored in its cache, the caching device can locate the resource in the cache based on the URL and provide the resource to the client device. This provides for a faster response to the client device than if the caching device had to forward the request to a web server and wait for a response containing the resource from the web server before transmitting the resource to the client. Caching also allows the web server to distribute some of its load of requests, as there can be many caching devices that can store copies of the resource requested. (In the case of a web service resource, the information returned from the web service can be cached.) For requests met by the caching device, the web server does not have to respond to the request itself.

In various implementations, the system improves caching by instructing the client to modify the URLs in future resource requests after an initial request to a resource. The modified URL is the resource's original URL but with the inclusion of a path component that indicates the natural language of the information in the response. This allows a caching device to cache a different copy of the resource for each language since each is associated with a unique URL.

Figure 1:
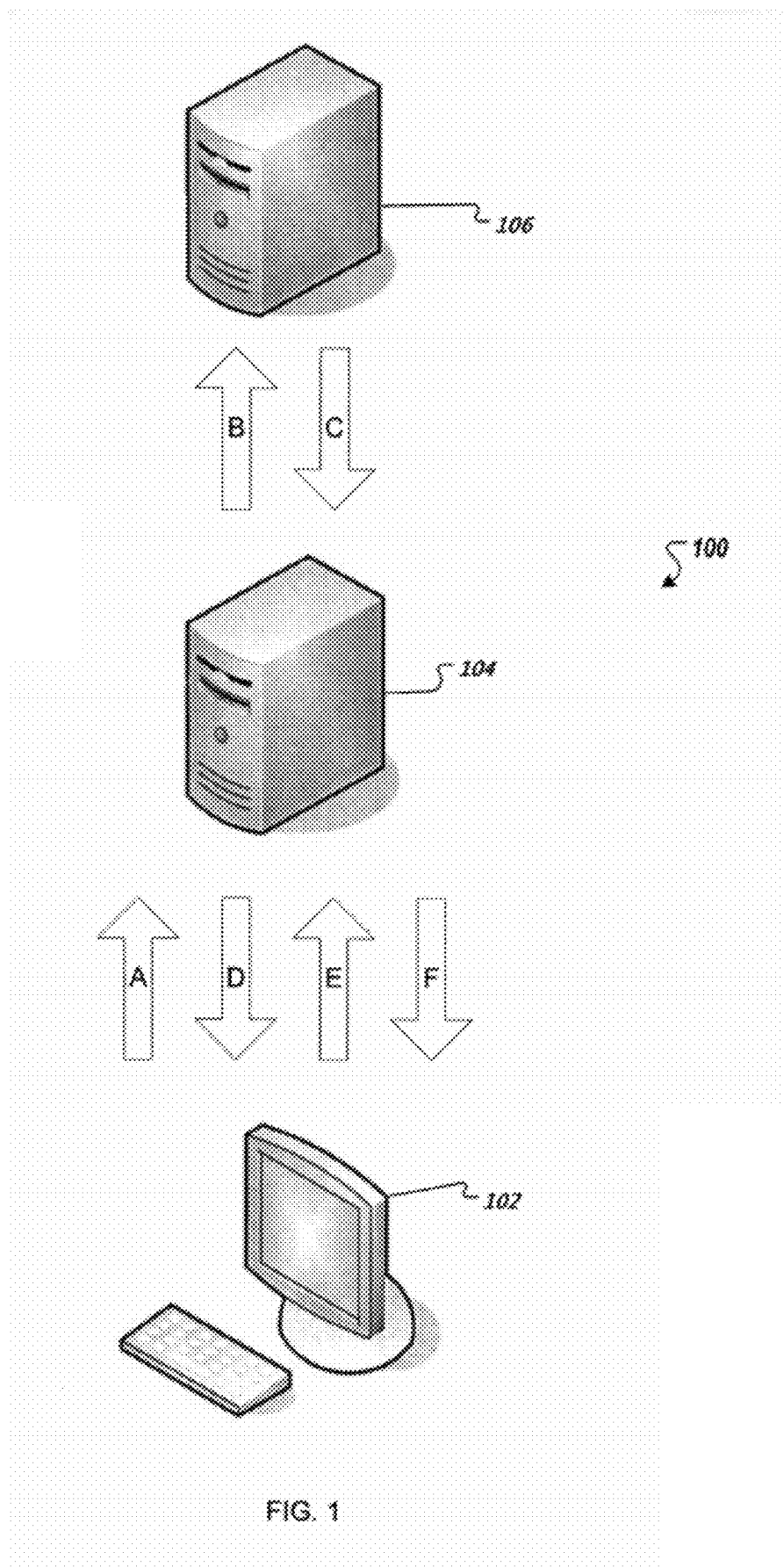
FIG. 1 illustrates an example caching data flow.

FIG. 1 illustrates an example caching data flow 100. A client device 102 can communicate information through one or more networks with a web server 106. A caching device 104 can be on the network on a network path "between" the client device 102 and the web server 106. For example, a user can access the Internet through an ISP. The ISP can maintain a caching proxy server that serves as a caching device 104. Additionally, any of the devices on the network that route and forward the data packets that constitute HTTP requests and responses, for example, can also act as caching devices 104. Alternatively, or in addition, some of these devices may route requests to devices explicitly used for caching for a specific server, for example, by resolving a URL hostname to the IP address of a caching device 104 instead of the web server 106. In addition, there are other ways a caching device 104 can be between a client device 102 and a web server 106.

As the caching device 104 receives requests from the client device 102 meant for the web server 106, the caching device 104 can respond to requests from the client device 102 for web resources if the caching device 104 has in its cache the resource requested by the client device 102. The labeled arrows indicate an example interaction between the client device 102, the caching device 104, and the web server 106 using a technique to improve the caching of resources requested by the client device 102.

The client device 102 can be any computing device capable of connecting to a network, such as an intranet, a local area network, a cellular network, or the Internet, for example. The client device can, for example, be a laptop computer, a desktop computer, a smartphone, a netbook, a tablet computer, or any of a number of devices with network connection capabilities. The client device can request resources through one or more networks, such as the Internet. A resource can be requested through a URL, for instance. A resource such as a web service can be a software system designed to support interaction between devices over a network. For example, a web service can be a mapping web service that can provide interactive maps of different locations and directions. The web service can provide a user interface that is displayed on the client device. The client device 102 can request the resource using the resource's URL (e.g., the URL of a website) from the web server 106.

The web server 106 can be a server or a system of servers that hosts and provides resources for client devices. The web server 106 can provide the resources by communicating to the client device 102 using HTTP or another protocol. For example, the web server 106 can provide an interactive map service to the client device 102 which provides geographical data to the client device 102 so that the client device 102 can display maps to the user. To improve the speed of the responses to these requests, the network can include caching devices 104 that distribute the functionality of the web server 106.

The caching device 104 can be on the network between the client server 102 and the web server 106. The caching device 104 can be any number of processing devices that provide caching functionality, including forward caches, reverse caches, web proxies, or the web browser on the client device 102. For example, the caching device 104 can be a proxy server that receives requests from client devices 102 and passes the requests to web servers 106. The caching device 104 can copy resources received from the web server 106 into its cache when it forwards the resources to client devices 102. (In the case of a service, the caching device 104 can copy the information returned by the invocation of the service.) The next time the caching device 104 receives a request for the resource it has stored from the same or a different client device, the caching device 104 can provide the resource to the client device 102 without having to forward the request and wait for a response from the web server 106. The resource can be identified by the caching device 104 based on the URL of the resource, for instance.

For example, arrow A can represent an HTTP request from a client device 102 for a resource using a URL such as "http://www.google.com". The request can be received by a caching device 104. The caching device 104 can check a cache to determine if the cache has a copy of the resource identified by the URL, in this case, "http://www.google.com". If the caching device 104 does not have a copy of the resource in its cache, it can pass the request on to the web server 106, as represented by arrow B. The web server 106 locates the resource requested and responds with an HTTP response represented by arrow C. The caching device 104 receives the response and passes it on to the client 102. The caching device 104 can also make a copy of the resource and store that copy in its cache. Then at a later time, the client 102 (or a different client) can request the same resource identified by the same URL, "http://www.google.com", represented by arrow E. The caching device 104 can then check its cache and retrieve the copy stored previously by the caching device 104. The caching device 104 can then respond with the requested resource directly to the client 102, represented by arrow F. The caching device 104 can also respond to other client devices that request the same resource with the copy stored in its cache, without having to forward each request to the web server 106.

In another example, the request represented by arrow A can be a request to a map service, identified by the URL "http://maps.google.com". The map service has a client user interface that is available in numerous natural languages, such as English, French, Spanish, and so on. All of the different languages in which the service is provided are accessible through the same URL, "http://maps.google.com". The caching device 104 receives the request and forwards the request to the web server 106. This is represented by arrow B. In some implementations, the web server 106 can examine the Accept-Language header and determine the natural language preference of the user.

Other ways of determining the natural language preference of the user are possible. In some implementations, the web server 106 can use the domain contacted by the client device 102 to infer a preferred language. For example, "http://maps- .google.de" can be interpreted to mean the client device 102 prefers German. In some implementations, the web server 106 can use the geolocation of the IP address of the client device 102 to determine in which country the client device 102 is located. For example, if the IP address belongs to a netblock in Madrid, the web server 106 can provide information in Spanish.

Using this information, the web server 106 can, in its response, instruct the client device 102 to modify the URL of future requests. The web server 106 can include a natural language code (e.g., "en") in its HTTP response that the client is to use in constructing URLs of future requests, such as, "http://maps.google.com/maps?hl=en". The caching device 104 receives the HTTP response from the web server 106, as represented by arrow C. The caching device 104 can forward this response on to the client device 102, represented by arrow D.

As the response from the web server 106 includes instructions to include the natural language code in future requests from the client device 102, the client device 102 can modify URLs of future requests. For example, the map service can link to a resource that provides driving directions, identified by "http://maps.google.com/directions". The client device 102 can request this resource, but modify the URL to include the natural language preference, changing the URL, for example, to "http://maps.google.com/directions?hl=en". The user can click on this link, resulting in the client device 102 requesting the directions resource in English, for example, represented by arrow E. The caching device 104 can already have the web page corresponding to this URL stored in its cache from previous interactions and be able to provide the web page to the client 102, represented by arrow F. The caching device 104 provides the correct language version of the resource because the preferred natural language of the user is made explicit in the modified URL.

Figure 2:
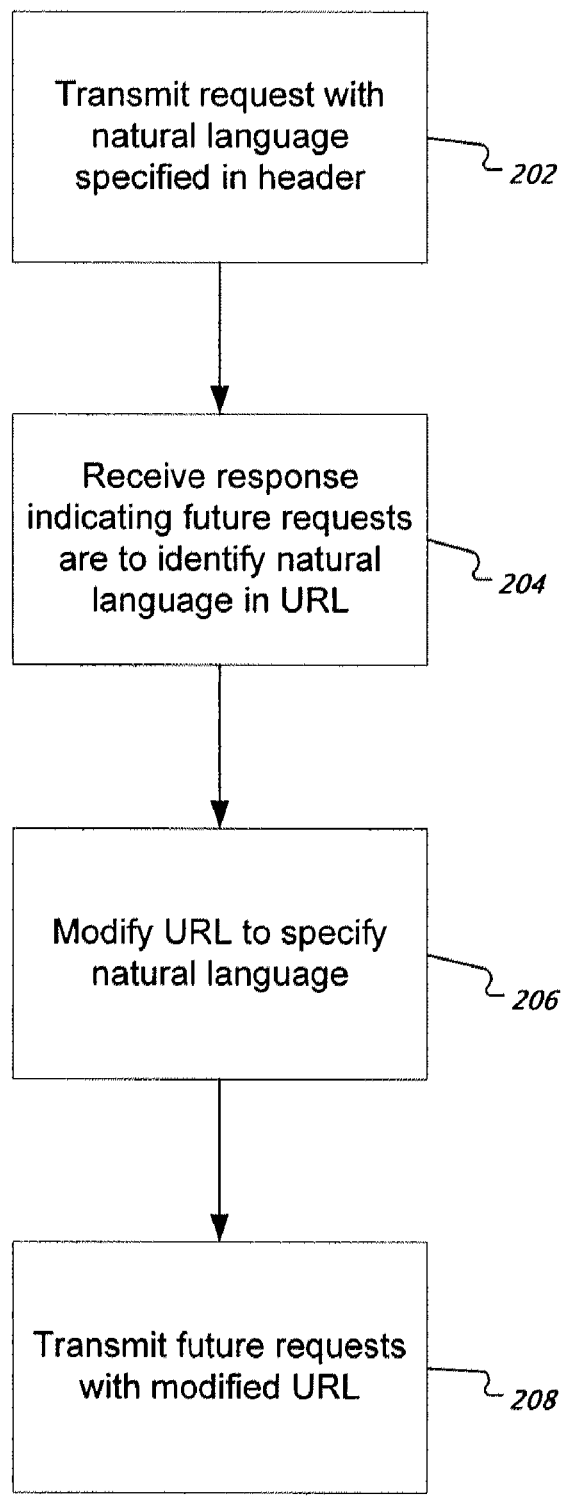
FIG. 2 is a flow chart showing an example caching technique.

FIG. 2 further describes this process in a flow chart. In step 202, the client transmits an HTTP request with a natural language specified in a header. The request can be for any resource, including web pages, images, videos, documents, and services. The resources can have client user interfaces available in more than one language, with the preferred language version of the user interface specified in the header of the HTTP request, such as the Accept-Language field.

In step 204, the client receives a response indicating that future requests are to identify the natural language preference in the URL of the requests. The URL can be modified in many different ways, for example by adding a string denoting a field and value pair, or by characters that the server understands to correspond to a specific preference. This can be executed by using a script, for example, through a program written in JAVASCRIPT or by invoking a procedure or function in a web service. In step 206, the client modifies a URL for a future resource request to specify the natural language preference explicitly in the URL as instructed by the server.

In step 208, the client transmits future requests with modified URLs. The client then receives information from the server in future responses. The server can provide information in the form of the requested resource to the client device. The information will be localized, or have other indicated user preferences, as specified by the modified URL. As the URL is modified to explicitly include the user preference of the resource, a caching device can cache the resource localized to the appropriate language. The caching device can include the client device or separate caching devices on the network path between the server and the client device.

Figure 3:
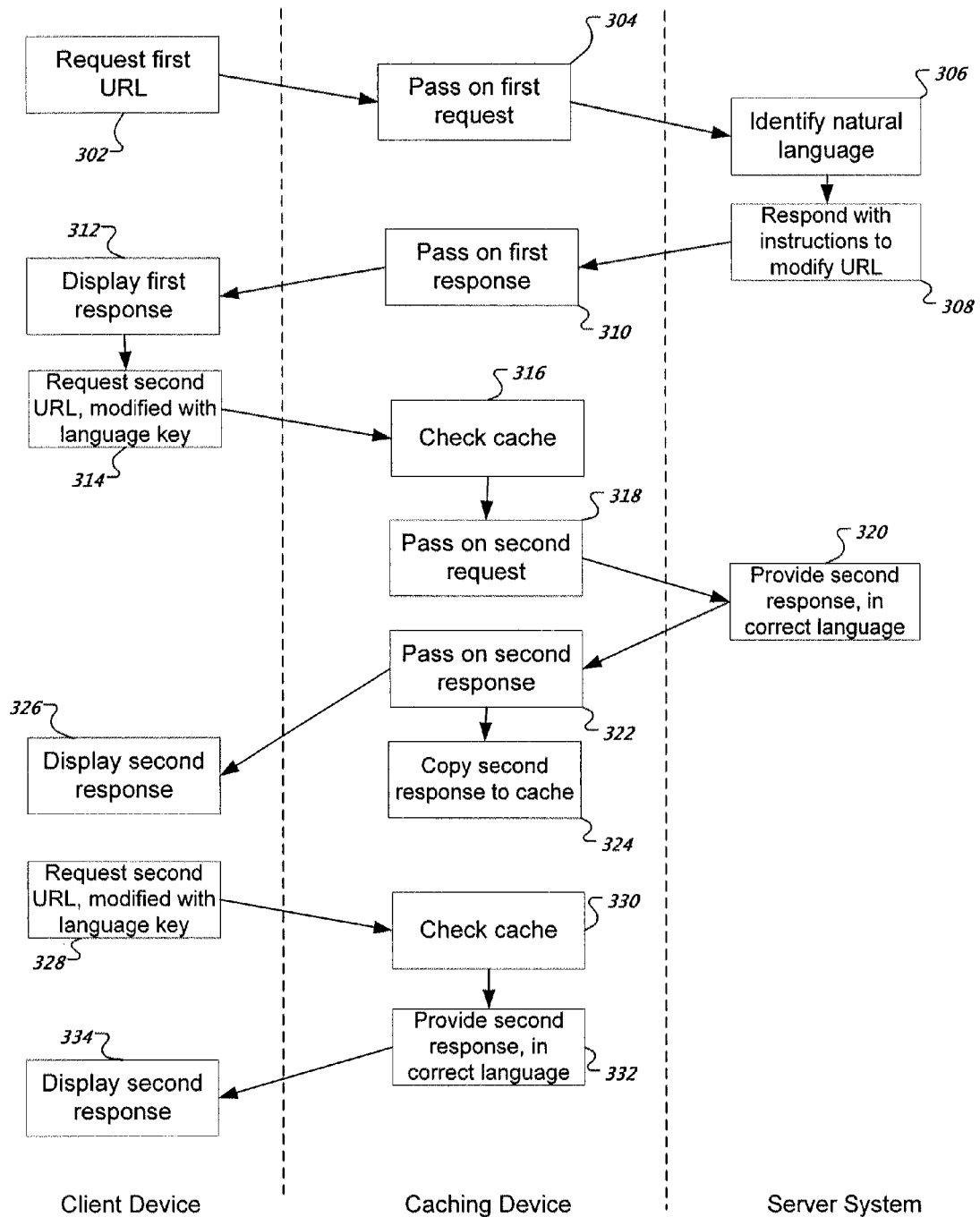
FIG. 3 is a swim lane diagram showing an example caching technique.

FIG. 3 is a swim lane diagram showing a method of improving caching. Each of the columns shows actions taken by a different device. A client device requests a first resource, such as a web service, by its URL (302). The HTTP request can contain a value in its header, for example, in the Accept-Language field that specifies the natural language the user prefers.

The request is received by a caching device, which can check its cache for a copy of the requested resource. However, if the appropriate HTTP response contains a Vary header value, the caching device may not cache a copy of the resource. The caching device then forwards the request to a server system (304).

The server system receives the request and identifies the natural language desired by looking at the value of the Accept-Language field (306). The server includes the preferred natural language code in its response (308) and indicates to the client device that future requests to the server for related resources are to include the natural language code in the URL of the requests.

The caching device then receives the response resource and forwards the resource on to the client device (310). The client device then displays the first response resource (312). The resource can be a web service, for example, and the first response can include a user interface for the map service. The client user interface is in the language preferred by the user, specified first in the Accept-Language header value, and now known to the service running on the client device by the language code included in the response.

The user can use the map service to make a second request, for example, for directions from the user's home to her workplace (314). The client will modify the URL for the second request, for example, with the language token string. The client device sends the second request to the server system, by way of the caching device on the network.

The caching device receives the second request and checks its cache for a copy of the resource requested (316). The caching device can check its cache based on the URL in the request without considering the Accept-Language header, as the preferred language is embedded in the URL. If this is the first time the caching device receives a request for this resource, the caching device may not have the resource in its cache. Alternatively, there are many other reasons why the caching device may not have stored this resource. If the caching device does not find the resource requested in its cache, the caching device forwards the second request to the server system (318).

The server system responds with a second resource, requested in the second request (320). For example, the server can provide the directions requested by the client device (314). The second response will be in the user's preferred natural language, and the server does not need to refer to the Accept-Language header as the URL already contains the language token string. The server sends the response to the client device, via the caching device.

The caching device then receives the second response resource (322). The caching device passes the second response on to the client device, but also can make a copy of the resource to store in its cache (324). The caching device stores the copy of the resource keyed to the URL so that if the caching device receives a future request of the resource, the caching device can refer to the URL to check for a copy of the resource in its cache.

The client device can then display the second response resource, for example, the directions requested by the user (326). The directions will be displayed on the client user interface in the user's preferred language.

At a later time, the user can again request the second resource, for example, the same directions from her home to her workplace (328). The request contains the language token string in the URL. The request can be made by going through the same steps as in the first instance, for example, through the map service homepage. Alternatively, the user can have the directions bookmarked on her browser, the user can refresh the page with the directions, or the user can simply type the entire URL string into the browser. There can be other ways the user requests the second resource URL. The client device again sends this request to the server, via the caching device The caching device can check its cache using the requested URL as the key, to see if the caching device has the requested resource (330). As the caching device stored a copy of the resource earlier (324), the caching device can find the resource requested. As the caching device has a copy of the requested resource in its cache, the caching device can provide the resource in response (332).

The client device can then display the second response (334). Alternatively, or in addition, the interaction between client device and caching device from 328-334 can be with a client device different from the one that made the initial requests.

Figure 4:
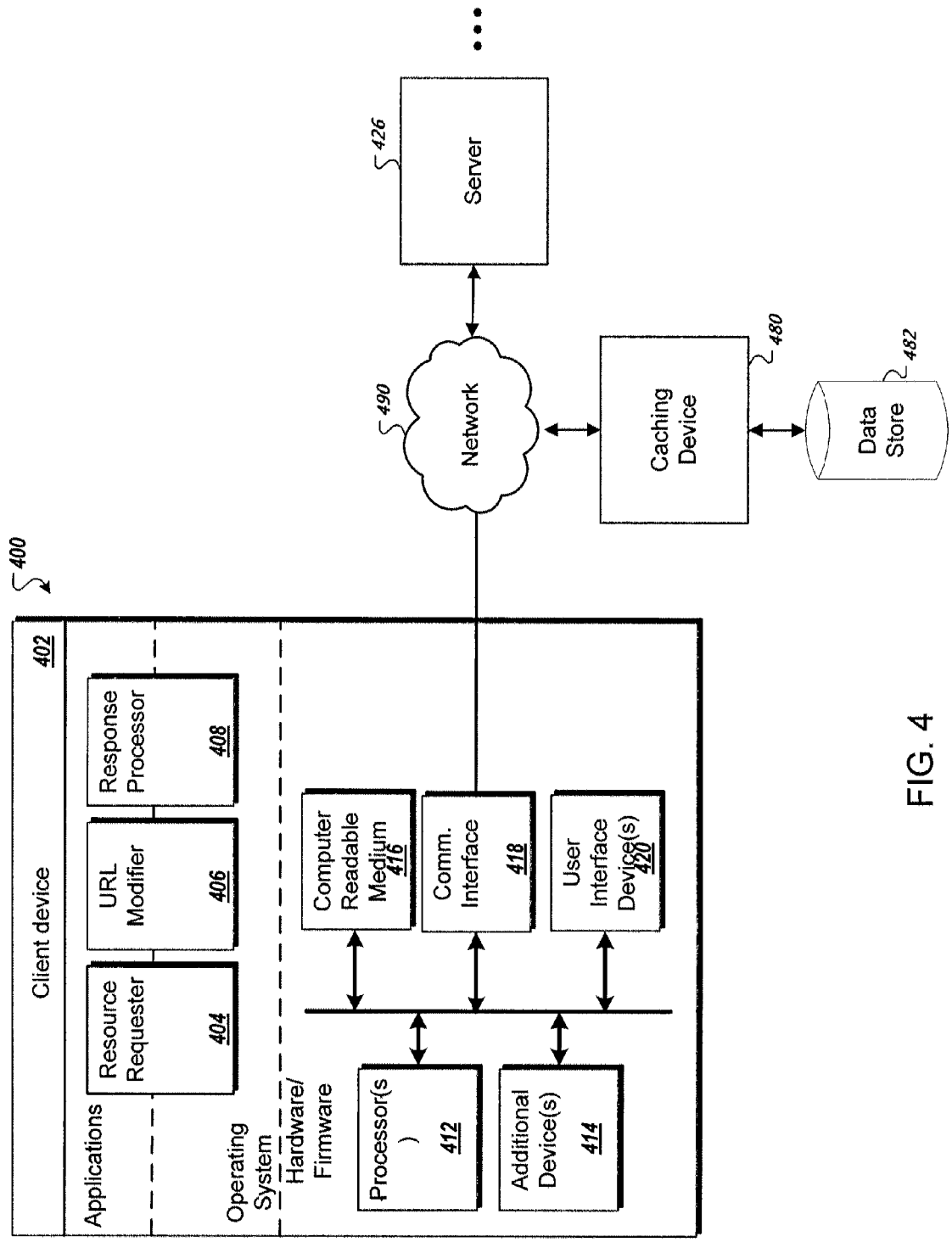
FIG. 4 illustrates an example architecture of a system.

FIG. 4 illustrates an example architecture of a system 400. The system 400 generally consists of a client device 402 and a server 426. The client device 402 and the server 426 are connected through a network 490, e.g., the Internet. While only one server 426 is shown in FIG. 4, multiple servers can constitute a server system for the client device 402 through the network 490. The client device 402 is a data processing apparatus, for example. While only one data processing apparatus is shown in FIG. 4, the client device 402 can consist of multiple data processing apparatuses.

The client device 402 includes various modules, e.g. executable software programs, including a resource requester 404, a URL modifier 406, and a response processor 408. These programs can be implemented in one container program, such as a web browser. The resource requester 404 requests resources from a server 426, for example, as described above in reference to FIGS. 2 and 3. The URL modifier 406 modifies URLs to include preferences for resource requests, for example, as described above in reference to FIGS. 2 and 3. The response processor 408 processes resources received in response to requests, for example, as described above in reference to FIGS. 2 and 3. The client device 402 can also have hardware or firmware devices including one or more processors 412, one or more additional devices 414, computer readable medium 416, and one or more user interface devices 420. Examples of user interface devices 420 include a display, a camera, a speaker, a microphone, a tactile feedback device, a keyboard, and a mouse.

In some implementations, the client device 402 stores resources. In some implementations, some or all of the resources are stored on a computer readable medium 416. In some implementations, some or all of the resources are stored on one or more additional devices 414, for example, a hard drive.

The client device 402 uses its communication interface 418 to communicate with the server 426 and optionally other devices through the network 490. For example, the client device 402 can request resources through its communication interface 418, and can receive resources in response through its communication interface 418.

The server 426 is connected to the client device 402 through the network 490 via a caching device 480. The server 426 is one or more data processing apparatuses. A user can use the client device 402 to request resources from the server 426, for example, through a web browser run on the client device 402. The user can also use the client device 402 to view resources provided in response to the requests, and submit further requests, for example, through a web browser.

The caching device 480 is connected to the client device 402 and the server 426 through the network 490. The caching device 480 is one or more data processing apparatuses. The caching device has a data store 482 for storing resources received from the server 426 and to provide stored resources to the client device 402. The data store 482 can be any computer readable medium, or additional devices for storing data connected to the caching device 480 physically or through a network. In some implementations, the caching device 480 and the client device 402 can be the same device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
   transmitting a request for a service in which the request specifies a natural language of a client user interface in a header of the request, wherein the service is a map service and the client user interface presents a geographic map;

receiving a response to the request indicating that future requests for the service are to identify the natural language in a uniform resource locator (URL) for the service;

modifying the URL to include a path component that specifies the natural language; and transmitting one of the future requests for the service using the modified URL and receiving information in response that is localized to the natural language specified in the path component of the modified URL, and in which the information is cached using a key comprising the modified URL by one or more data processing apparatuses that receive the information;

wherein the information does not include a hypertext transfer protocol Vary field.

2. The method of claim 1 in which the header is a hypertext transfer protocol header.

3. The method of claim 1 in which the client user interface is presented by a web browser.

4. The method of claim 1 in which the one or more data processing apparatuses include a proxy server.

5. The method of claim 1 in which the one or more data processing apparatuses include a client device.

6. A system comprising:

a storage medium including instructions;

one or more data processing apparatuses configured to execute the instructions to perform operations comprising:

transmitting a request for a service in which the request specifies a natural language of a client user interface in a header of the request, wherein the service is a map service and the client user interface presents a geographic map;

receiving a response to the request indicating that future requests for the service are to identify the natural language in a uniform resource locator (URL) for the service;

modifying the URL to include a path component that specifies the natural language; and transmitting one of the future requests for the service using the modified URL and receiving information in response that is localized to the natural language specified in the path component of the modified URL, and in which the information is cached using a key comprising the modified URL by one or more caching devices that receive the information;

wherein the information does not include a hypertext transfer protocol Vary field.

7. The system of claim 6 in which the header is a hypertext transfer protocol header.

8. The system of claim 6 in which the client user interface is presented by a web browser.

9. The system of claim 6 in which the one or more caching devices include a proxy server.

10. The system of claim 6 in which the one or more caching devices include a client device.

11. A non-transitory computer storage medium encoded with a computer program, the program comprising instructions that when executed by data processing apparatus cause the data processing apparatus to perform operations comprising:

transmitting a request for a service in which the request specifies a natural language of a client user interface in a header of the request, wherein the service is a map service and the client user interface presents a geographic map;

receiving a response to the request indicating that future requests for the service are to identify the natural language in a uniform resource locator (URL) for the service;

modifying the URL to include a path component that specifies the natural language; and transmitting one of the future requests for the service using the modified URL and receiving information in response that is localized to the natural language specified in the path component of the modified URL, and in which the information is cached using a key comprising the modified URL by one or more data processing apparatuses that receive the information;

wherein the information does not include a hypertext transfer protocol Vary field.

12. The medium of claim 11 in which the header is a hypertext transfer protocol header.

13. The medium of claim 11 in which the client user interface is presented by a web browser.

14. The medium of claim 11 in which the one or more caching devices include a proxy server.

15. The medium of claim 11 in which the one or more caching devices include a client device.

\* \* \* \* \*